United States Patent [19]

Bozeman, Jr.

[11] Patent Number: 5,736,970

[45] Date of Patent: *Apr. 7, 1998

[54] ACCELEROMETER METHOD AND APPARATUS FOR INTEGRAL DISPLAY AND CONTROL FUNCTIONS

[75] Inventor: Richard J. Bozeman, Jr., Dickinson, Tex.

[73] Assignee: The United States of America as represented by the Administrator of the National Aeronautics and Space Administration, Washington, D.C.

[*] Notice: The term of this patent shall not extend beyond the expiration date of Pat. No. 5,517,183.

[21] Appl. No.: 342,453

[22] Filed: Nov. 16, 1994

Related U.S. Application Data

[62] Division of Ser. No. 901,626, Jun. 19, 1992, Pat. No. 5,517,183.

[51] Int. Cl.$^6$ ........................................ G09G 3/04
[52] U.S. Cl. ........................... 345/35; 340/669; 340/691; 73/503; 73/499
[58] Field of Search .................... 345/33, 34, 35, 345/39, 42, 36, 37, 38, 44, 46, 48, 51, 52; 340/683, 669, 691, 753, 754; 73/503, 499; 324/162; 307/121; 361/236; 364/566, 508

[56] References Cited

U.S. PATENT DOCUMENTS

| | | | |
|---|---|---|---|
| 3,487,263 | 12/1969 | Pahlavan | 345/35 |
| 5,269,187 | 12/1993 | Hanson | 340/461 |
| 5,517,183 | 5/1996 | Bozeman, Jr. | 340/669 |

Primary Examiner—Xiao Wu
Attorney, Agent, or Firm—Hardie R. Barr

[57] ABSTRACT

Method and apparatus for detecting mechanical vibrations and outputting a signal in response thereto. An accelerometer package having integral display and control functions is suitable for mounting upon the machinery to be monitored. Display circuitry provides signals to a bar graph display which may be used to monitor machine conditions over a period of time. Control switches may be set which correspond to elements in the bar graph to provide an alert if vibration signals increase in amplitude over a selected trip point. The circuitry is shock mounted within the accelerometer housing. The method provides for outputting a broadband analog accelerometer signal, integrating this signal to produce a velocity signal, integrating and calibrating the velocity signal before application to a display driver, and selecting a trip point at which a digitally compatible output signal is generated.

9 Claims, 2 Drawing Sheets

ACCELEROMETER METHOD AND APPARATUS FOR INTEGRAL DISPLAY AND CONTROL FUNCTIONS

This application is a division of application Ser. No. 07/901,626, filed Jun. 19, 1992, now U.S. Pat. No. 5,517,183.

ORIGIN OF THE INVENTION

The invention described herein was made by an employee of the United States Government and may be manufactured and used by or for the Government of the United States of America for governmental purposes without the payment of any royalties thereon or therefor.

TECHNICAL FIELD

The present invention relates to apparatus and method for monitoring machine vibration. More particularly, the present invention is directed to an accelerometer package containing a vibration transducer with an integral and improved display and control function.

BACKGROUND ART

Vibration analysis has been used for years to provide a determination of the proper functioning of different types of machinery, including rotating machinery and rocket engines. A determination of a malfunction, if detected at a relatively early stage in its development, will allow changes in operating mode or a sequenced shut down of the machinery prior to a total failure. Such preventative measures result in less extensive and/or less expensive repairs, and can also prevent a sometimes catastrophic failure of equipment.

Standard vibration analyzers are generally rather complex and difficult to transport, on a routine basis, to machinery for vibration analysis purposes. Due to this logistics problem and the necessary complexity of such systems, a high cost is often associated with standard vibration analyzers. If vibration analyzer systems are permanently positioned adjacent machinery to be monitored, they may be used to provide control signals in response to vibration detected. However, if the control circuitry is located some distance from the vibration analysis system, there may be errors produced due to ground shifts/ground loops which typically occur in the harsh and electrically noisy operating environments in which rotating machinery operate. Ground loops/ground shifts, as used herein, are voltage differences between various circuit grounds. These voltage differences between grounds are typically variable, unknown, and tend to cause false signals. If the detector circuitry for the vibration analysis equipment and accelerometer transducer are located some distance apart and/or powered by different power supplies, those components may also be subject to ground loop errors.

Less complex and costly hand held vibration analyzers typically do not provide adjustable trip point signals to actuate alarms or shutdown equipment in response to sensed vibrations. Since consistent long term measurement of vibration may be sensitive to precise accelerometer sensor location and orientation, it may be difficult to monitor long term machinery condition using hand held equipment that does not provide for permanent fixture of the accelerometer sensor. The circuitry of hand held vibration monitoring equipment is generally not suitable for permanent mounting to machinery to be observed.

A panel mounted accelerometer display is disclosed in U.S. Pat. No. 4,622,548 to J. R. Andres and D. D. Wilson. The G-force acceleration measuring instrument is designed for use in aircraft, spacecraft, submarine, or other vehicles, and employs electronic sensing and display transducers for increased reliability with relatively small size and small mass. The instrument includes a bar graph display, preferably incorporating liquid crystal transducer elements. It uses a solid state or limited motion acceleration transducer and provides graphic and numeric indication of the present G-force value together with number indication of historic maximum and minimum G-force values. The instrument also includes gain adjustment arrangements for accommodating different instrument panel mounting and different types of vehicles with different G-force capability, and has a signal output tap for recording or slave indicating or telemetry or feed-back use. Since this device is designed to be panel mounted, there are no provisions for retro-fitting it to an existing commercial accelerometer to form an integral unit to save costs of construction. No means are disclosed for vibration isolation of the electronics. For this reason it is probably not suitable for direct "on machine" mounting. It is also rather bulky for such installation. While the unit is of small size relative to other panel mount devices, it is relatively large and bulky for machine mounting. The electronics may be too complex for "on machine" mounting and include analog to digital components as well as sample and hold circuits. There is no means for providing a digital trip signal or for varying the conditions which would produce such a trip signal. No velocity signal output is available. While the scales may be changed, the device is limited to linear scales and cannot readily be changed for monitoring with logarithmic scales.

Purely mechanical accelerometers are available for monitoring purposes but do not have a means for providing electrical error or trip signals. Purely mechanical accelerometers may be difficult to read unless external lighting is provided. Mechanical accelerometers have a fixed scale so that different accelerometers must be used for different machines depending on the expected range of vibration to be measured. Typically, there is no convenient means to change the range of measurement of a mechanical accelerometer.

U.S. Pat. No. 4,198,864 to D. S. Breed discloses a mechanical apparatus for sensing and recording changes in the velocity of a vehicle involved in a crash. It is comprised of a sensing mass biased to an initial position. The biasing force is only overcome by an acceleration having a certain magnitude or greater. The mass will move a distance proportional to the force and will remain in position if the magnitude and duration of force are sufficient to overcome preset values. This device is suitable for measuring forces in a single catastrophic occurrence but is not suitable for on-going monitoring of equipment.

U.S. Pat. No. 4,470,302 to N. E. Cart discloses a mechanical shipping accelerometer having a transparent tube within which an inertial mass moves indicators relative to a fixed scale affixed to the transparent tube to provide an indication of maximum shock incurred in either direction of its longitudinal axis. Springs on either side of the inertial mass maintain the inertial mass in its initial position. As with other mechanical accelerometers, the absence of an electronic trip signal, the ability to change scales, and a lack of an illuminated scale limits its usefulness.

Consequently, a need exists for improvements in accelerometer electronic displays and control functions which are more suitable for operation directly on machines and which are not so expensive and complex. Those skilled in the art have long sought and will appreciate the novel features of the present invention which solves these problems.

STATEMENT OF THE INVENTION

The present invention is directed, in a preferred embodiment, to an improved accelerometer package containing not only a transducer but also display electronics and a switch selectable trip level for providing a fault signal. The resulting packaged system may be incorporated within an accelerometer case during the original manufacturing process, or may be retro-fitted into commercially available accelerometers. Micrologic and surface mount technology may be employed to significantly reduce the package size. Small mass and size are important to package construction which is designed for machine mounting directly adjacent those mechanical components whose vibration is to be monitored.

The present invention, in a preferred embodiment, includes a linear display driver for driving an electronic bar graph display. The linear display driver is pin for pin compatible with a logarithmic display driver so that a substitution may be made to provide a wide dynamic range. With a 10 segment readout which provides 3 db/segment, a dynamic range of 30 db is available. A dip switch component is also available so that any segment may be selected and used to provide a digitally compatible trip signal which is contemplated to be optically isolated so as to avoid the problem of ground loops which may be present. In a preferred embodiment, the accelerometer output is integrated to provide a velocity signal and has a velocity signal output for use external to the package. A broad band accelerometer output is also available for external use. A potentiometer is used for calibrating the device based on accelerometer calibrations which are normally supplied by the manufacturer of the accelerometer. A housing with two windows is used in the preferred embodiment so that the bar graph is directly visible from the first window and ready access is available from the second window to the dip switches for the purpose of setting a trip level. In a preferred embodiment, two low durometer internal O-rings are used to provide vibration damping for the retro-fit electronic package.

Accordingly, it is an object of the present invention to provide a direct display of "G" levels from the accelerometer package which may be mounted directly on the machine component to be monitored.

A feature of the present invention is the ability to select "G" level trip points for providing a digitally compatible error signal without the need for complex processing equipment.

An advantage of the present invention is the low cost for a compact package that includes features that normally are provided only with more complex and expensive vibration monitoring equipment.

These and other objects, features, and advantages of the present invention will become apparent from the following detailed description, wherein reference is made to the figures in the accompanying drawings.

While the invention will be described in connection with the presently preferred embodiment, it will be understood that it is not intended to limit the invention to this embodiment. On the contrary, it is intended to cover all alternatives, modifications, and equivalents as may be included in the spirit of the invention.

DETAILED DESCRIPTION OF THE PREFERRED EMBODIMENT

Figures 2, 3:
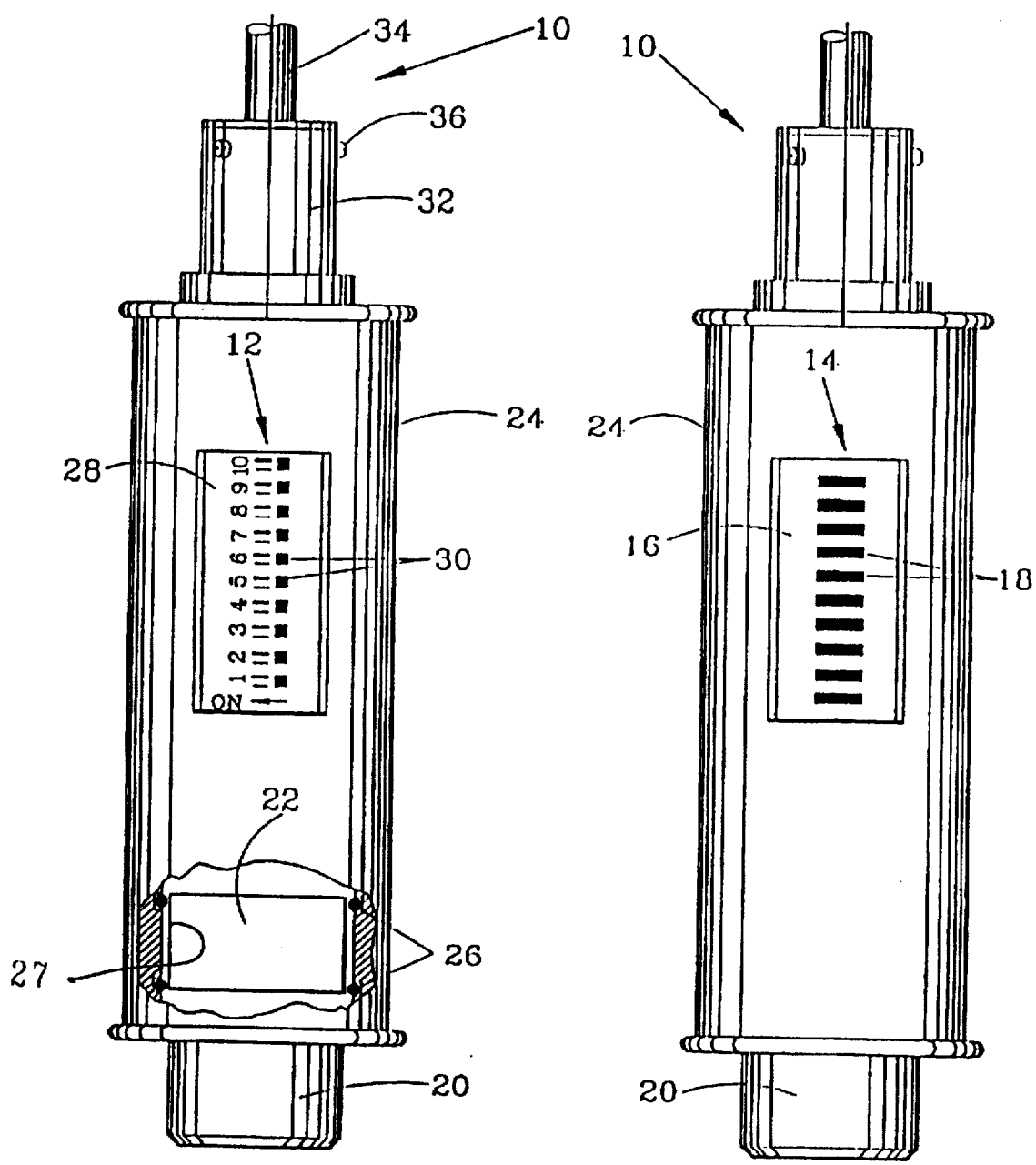
FIG. 2 is an elevational view, partially in section, of an accelerometer display and control in accord with the present invention.
FIG. 3 is an elevational view, from the opposite side as shown in FIG. 2, of an accelerometer display and control in accord with the present invention.

The present invention is directed to an accelerometer package that includes an integral display and control. A preferred embodiment accelerometer package 10 may be seen in FIG. 2 and FIG. 3. FIG. 2 and FIG. 3 provide views of accelerometer package 10 from opposite sides rotated 180° so that windows 12 and 14 may be observed. Within window 14 can be seen electronic bar graph 16 which is composed of discrete bar graph elements 18. Elements 18 may include individual light emitting diodes or liquid crystal elements or other such display elements as may be suitable. In applications where the lighting is not conducive to clear viewing of displays, it may be more desirable to use light emitting diodes or provide additional display lighting. As the accelerometer signal amplitude increases as a result of increased vibrations, a greater number of elements 18 on display 16 will be activated. Since accelerometer package 10 is designed to be mounted to mechanical equipment to be observed, long term monitoring of mechanical equipment is possible with some assurance that long term changes seen in bar graph 16 are caused by mechanical differences rather than the mechanical coupling or exact placement and orientation of the accelerometer sensor with respect to the monitored machinery.

In a preferred embodiment, accelerometer section 20 is a commercial accelerometer to which a retrofit package is added. Accelerometer package 10 may be built as a single unit during manufacture. Micrologic technology could be employed during manufacture so as to create an overall smaller package. Circuit board 22 is shock-mounted in body 24 with low durometer O-rings 26 which are seated in an internal cylindrical wall 27 of the body 24. Other techniques for mounting include washers, springs, rubber feet, etc.

Window 12 in FIG. 2 discloses dip switch package 28 composed of ten individual switches 30. In this embodiment, individual switches 30 may be selected to produce a digital trip signal at a chosen "G" force level. As an example, if bar graph 16 is calibrated to read linearly from 0 to 5 G's and it is desired to have accelerometer package 10 produce a digital trip signal for vibration of approximately 3.5 G's for control purposes, then switch 7 could be selected to achieve this response. Each additional switch represents an increment of 0.5 G's so that switch 7 would be the appropriate switch for 3.5 G's. This operation is explained in more detail subsequently in connection with the circuit diagram of FIG. 1.

A typical application for this device could be local monitoring of a machine vibration level where a "G" level is selected at which some action is desired, i.e. machine shut down, timing circuit activation, alarms, computer iteration, recording of signals, etc. When this feature is used, the digital signal is available at connector 32 through cable 34. Various connectors may be used for this purpose and connector 32 may include a lock screw 36 to secure connector 32 from backing off due to machine vibration. Various means can be used to mount accelerometer package 10 to the machinery to be monitored and body 24 may be of various shapes as desired. Micrologic and surface mount technology may be employed to significantly reduce the internal circuitry size as well as the size of body 24. Small packaging is especially desirable for machine mounting since a small mass and size will reduce the forces to which accelerometer package 10 is subjected.

Figure 1:
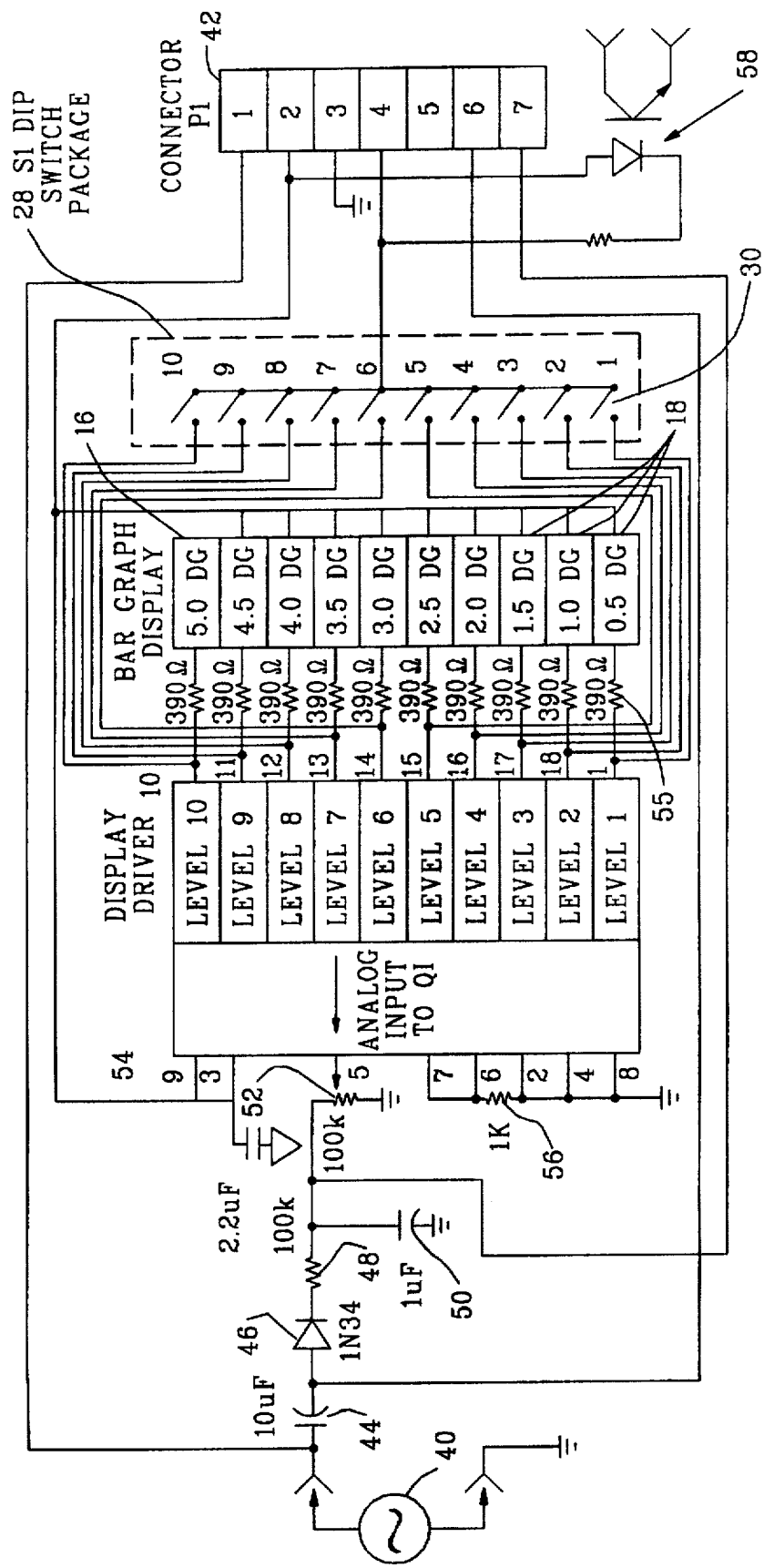
FIG. 1 is a diagrammatic representation of an accelerometer display and control in accord with the present invention.

FIG. 1 discloses a preferred embodiment circuit diagram. Accelerometer circuit 40 may include various types of accelerometer sensors including strain gauges and piezoelectric gauges. A built in amplifier (not shown) may be used with the accelerometer to increase output to a desired level. Power for the accelerometer is available from pin 1 of connector 42. Power for digital circuitry is supplied at pin 2 of connector 42. Capacitor 44, shown with a value of 10 micro Farads, is used as a D.C. filter to remove power supply voltage from the accelerometer signal before application to display and control circuitry.

Although specific values of components are provided for a, preferred embodiment description of the present invention, it is understood that in many cases different values may be used. As well, it is understood that different circuitry may often be used to provide equivalent results. A broad band accelerometer signal is connected to pin 6 of connector 42 to make this signal available for use as may be desired—for instance with accelerometer signal recording equipment. Diode 46 rectifies the accelerometer signal before it reaches integrator circuitry which includes resistor 48 and capacitor 50 shown as having values of 100 kiloohms and 1 micro-farad respectively. The integrated accelerometer signal, or velocity signal, is connected to pin 7 of connector 42 so that it will be available for analysis or display elsewhere as desired. In addition to integrating the accelerometer signal to produce a velocity signal, integrator circuitry provides a time constant to prevent a transient signal from tripping the system. While the values of resistor 48 and capacitor 50 shown provide a 0.1 second time constant, component values may be adjusted to provide a 1-2 second time constant to greatly reduce the possibility of transients. The larger time constant will also result in a steadier display at bar graph display 16. Variable resistor 52 is used to scale the signal for calibration purposes when it is applied to display driver 54. For instance, if the accelerometer calibration data provides that five G's equals five volts, then resistor 52 is adjusted so that a five volt input will activate the number of bar graph elements 18 that are designated to indicate five G's. Since a full scale reading would be equal to five G's in this example, resistor 52 is adjusted so that all display elements 18 are activated with a five volt input. The device will now read from zero to five G's in 0.5 G increments because there are ten elements 18 in the preferred embodiment of the present invention. Resistor 56 is used to set display brightness so that when bar graph display 16 of FIG. 3 uses light emitting diodes for elements 18, resistor 56 may be used to set the brightness of these elements. If it is desired that the display have a variable brightness, then resistor 56 may be a variable resistor.

Display driver 54 of the present embodiment has ten discrete outputs which are labeled as levels 1–10. Each of these ten outputs is used to drive one bar graph display element 18. When bar graph display is reading full scale so that all ten bar graph display elements 18 are activated, then all ten discrete display driver 54 outputs must also be activated. As shown with the level one output of display driver 54, each discrete display driver output 54 is connected through a resistor, such as resistor 55 having a nominal value of 390 ohms, to a corresponding input of bar graph display 16. As each discrete output from display driver 54 is activated, its corresponding output line is sinked to ground.

When level one output is activated and sinked to ground, then current will flow through resistor 56 and allow current to flow through the first bar graph element 18 light emitting diode of bar graph display 16. Each output from levels one through ten of display driver 54 operates in a similar manner. Power to each bar graph element. 18 is supplied via connection 2 of connector 42. A discrete output from display driver 54 sinks its corresponding output line to ground to provide a current flow path which results in activation of a bar graph display element 18. Each discrete output of display driver 54 is also connected to dip switch package 28 which was shown in FIG. 2 through window 12. Display driver 54 level one discrete output line is connected to the terminal at switch one, level two is connected to switch two, etc.

In operation, the level of bar graph display 16 can be observed prior to selecting a switch. Then a switch can be chosen which is above the indicated level for purposes of setting a trip point when the accelerometer signal or vibration increases. As can be seen, a common pole on each dip switch 1–10 of dip switch package 28 is connected to pin 4 of connector 42. The signal from did switch package 28 can be optically isolated as by optical isolator 58 to prevent ground loops from interfering with the signal so as to cause false signals. Optical isolator circuit 58 is intended to represent symbolically the addition of such a circuit and is not intended to show all connections or values of components which may be included in such a circuit such as a current limiting resistors, receiving circuits, etc. Optical isolator circuit may be integral to accelerometer package 10 or may be located at the receiving circuit. In operation, all switches in dip switch package 28 would be left in the open position except the switch which is related to the desired trip point level.

In summary, accelerometer 40 supplies a signal which is filtered by capacitor 44 and is rectified before integration and scaling. Resistor 52 is used to calibrate or scale the signal to accelerometer 40 calibrations which are normally supplied by the manufacturer. Discrete outputs from display driver 54 are directed to corresponding inputs of bar graph display 16 and also dip switch package 28 to allow display and also a trip level signal. If a logarithmic display is desired rather than a linear display, then a logarithmic display driver chip that is pin for pin compatible with display driver 54 may be directly substituted. In a preferred embodiment, display driver 54 is chosen to be a LM3914 integrated circuit for linear display and is chosen to be a LM3915 integrated circuit for logarithmic display. Variable resistor 52 can be used to calibrate the graph display when changing from linear to logarithmic display. The display can also be calibrated in decibels when using a logarithmic display driver 54 so that each display segment 18 could have a value of 3 db. This scale provides a wide dynamic range of operation of 30 decibels.

The foregoing description of the invention has been directed to a particular, preferred embodiment in accordance with the requirements of the patent statutes and for purposes of illustration. It will be apparent, however, to those skilled in the art that many modifications and changes in the specifically described accelerometer package 10 with integral display and control functions may be made without departing from the scope and spirit of the invention. Therefore, the invention is not restricted to the preferred embodiment illustrated but covers all modifications which may fall within the spirit of the invention.

We claim:

1. Display apparatus responsive to a transducer for detecting mechanical vibration and outputting an analog signal in response thereto, said display apparatus comprising:

a transducer electrical output connection for receiving a transducer signal;

a display driver for generating digital signals and applying said digital signals to a plurality of output lines, said digital signals being responsive to the amplitude of said analog transducer signal;

a bar graph display connected to said plurality of output lines, said bar graph display having a plurality of optical display segments which are activatable in response to said digital signals;

an output connector having a digital trip point signal contact;

a plurality of switches for selectively interconnecting said output connector and said display driver, at least one of said switches having a first contact in common with said output connector digital trip point signal contact, said at least one of said switches having a second contract in common with a corresponding one of said plurality of output lines of said display driver, said at least one of said switches including means for selectively connecting said first and second contacts in common with each other; and means for optically and electrically isolating said trip point control signal.

2. The apparatus of claim 1, further comprising:

each of said plurality of switches having a first contact in common with said output connector digital trip point contact, each of said plurality of switches having a second contact in common with respective ones of said plurality of display driver output lines, each of said switches including means for selectively connecting each respective first and second contact in common with each other.

3. The apparatus of claim 1, further comprising:

an integrating circuity electrically connected with said transducer output electrical connection, said integrating circuitry having an integrator output connected to said display driver.

4. The apparatus of claim 1, further comprising:

an optical isolating circuit, said optical isolating circuit being in common with said output connector digital trip point contact.

5. The apparatus of claim 1, further comprising a housing having a cavity therein defined by an internal wall: said display driver, said bar graph display, and said plurality of switches each being disposed within said cavity; and said housing having first and second windows, said bar graph display being disposed adjacent said first window in a position so as to be viewable through said first window and said plurality of switches being disposed adjacent second window in a position so as to be viewable through said second window.

6. The apparatus of claim 5, further comprising:

means disposed between said internal wall of said housing and said display driver for shock mounting said display driver.

7. Apparatus responsive to a transducer electrical analog output signal representative of mechanical vibration for producing a bar graph display, said apparatus comprising:

means for filtering a D.C. electrical component from said transducer electrical signal to produce filtered electrical output signal;

means for integrating said filtered electrical output signal to produce an integrating signal;

means for calibrating said integrated signal to produce a calibrated signal;

means for producing from said calibrated signal a number of discrete digitally compatible electrical output signals wherein the number of said digitally compatible electrical output signals is a positive correlation function of the amplitude of said calibrated signal and each said digitally compatible electrical output signal is generated at a different discrete threshold level of amplitude of said calibrated signal;

an output terminal;

means for applying a selected one of said digitally compatible output signals to said output terminal as an electrically isolated trip signal when said calibrated signal reaches the level of amplitude at which said selected digitally compatible output signal is generated;

a plurality of bar graph elements, each having an electrical input terminal and activatable by application of an electrical signal to its input terminal; and means for electrically coupling each of said plurality of digitally compatible output signals to a different one of the input terminals of said bar graph elements and activating those of said bar graph elements which are coupled to the digital output signals which exceed said trip level to thereby display said digitally compatible output signals as a function of the amplitude of said calibrated signal.

8. An apparatus as set forth in claim 7 said transducer is an accelerometer.

9. Apparatus responsive to a transducer analog output signal representative of mechanical vibration for producing a bar graph display, said apparatus comprising:

means for calibrating said transducer signal and for producing from said calibrated signal a number of discrete digitally compatible electrical output signals wherein the number of said digitally compatible electrical output signals is a positive correlation function of the amplitude of said calibrated signal and each said digitally compatible electrical output signal is generated at a different discrete threshold level of amplitude of said calibrated signal;

an output terminal;

means for applying a selected one of said digitally compatible output signals to said output terminal as a trip signal when said calibrated signal reaches the level of amplitude at which said selected digitally compatible output signal is generated;

means for electrically and optically isolating said trip signal to preclude ground loop interference therewith;

a plurality of bar graph elements, each having an electrical input terminal and activatable by application of an electrical signal to its input terminal; and means for electrically coupling each of said plurality of digitally compatible output signals to a different one of the input terminals of said bar graph elements and activating those bar graph elements which are coupled to the digital output signals which exceed said trip level to thereby display said digitally compatible output signals as a function of the amplitude of said calibrated signal.

* * * * *